(12) United States Patent
Niknafs et al.

(10) Patent No.: US 6,699,562 B2
(45) Date of Patent: Mar. 2, 2004

(54) CERAMIC PACKING ELEMENT

(75) Inventors: Hassan S. Niknafs, Stow, OH (US); Robert L. Miller, Stow, OH (US)

(73) Assignee: Saint-Gobain Corporation, Stow, OH (US)

( * ) Notice: Subject to any disclaimer, the term of this patent is extended or adjusted under 35 U.S.C. 154(b) by 9 days.

(21) Appl. No.: 10/087,564

(22) Filed: Feb. 28, 2002

(65) Prior Publication Data

US 2003/0161992 A1 Aug. 28, 2003

(51) Int. Cl.⁷ .................................................. B32B 3/12
(52) U.S. Cl. ..................... 428/116; 422/122; 422/177; 422/180; 422/222; 55/523; 165/177; 165/172; 95/115; 95/288
(58) Field of Search ................................ 428/116, 118, 428/117; 422/122, 177, 180, 211, 222; 55/523; 165/172, 177; 95/114, 115, 208

(56) References Cited

U.S. PATENT DOCUMENTS

| | | | |
|---|---|---|---|
| 1,307,635 A | 6/1919 | Nielsen | |
| 1,365,671 A | 1/1921 | Fairlie | |
| 2,212,932 A | 8/1940 | Fairlie | |
| 2,408,164 A | 9/1946 | Foster | |
| 3,907,710 A | 9/1975 | Lundsager | |
| 3,957,931 A | 5/1976 | Ellis et al. | |
| 4,122,011 A | 10/1978 | Strigle, Jr. | |
| 4,481,155 A | 11/1984 | Frohwerk | |
| 4,510,263 A | * 4/1985 | Pereira et al. | |
| 4,541,967 A | 9/1985 | Masaki | |
| 4,631,268 A | 12/1986 | Lachman et al. | |
| 5,017,542 A | 5/1991 | Martan et al. | |
| 6,007,915 A | * 12/1999 | Rukovena | |
| D445,029 S | 7/2001 | Niknafs | |
| 6,479,129 B1 | * 11/2002 | Kar et al. | |

FOREIGN PATENT DOCUMENTS

| | | |
|---|---|---|
| EP | A1 055 535 | 7/1982 |
| WO | WO 99/29425 | 6/1999 |

OTHER PUBLICATIONS

Product Advertisement from Inocermic, (Jul. 18, 2002) (www.inocermic.de).

* cited by examiner

Primary Examiner—Deborah Jones
Assistant Examiner—Wendy Boss
(74) Attorney, Agent, or Firm—Thomas G. Field, III

(57) ABSTRACT

The invention provides an improved ceramic packing element having the basic shape of a cylinder with an aspect ratio, defined by the diameter to length dimensions that is from 2.7 to 4.5.

7 Claims, 4 Drawing Sheets

CERAMIC PACKING ELEMENT

BACKGROUND OF THE INVENTION

This invention relates to packing elements of the type that are often called "random" or "dumped" packings. Such packings are used to fill towers units in which mass or heat transfer processes occur. A particularly important application is the use of such ceramic elements in heat recovery operations where it is necessary to provide maximum effective contact with hot fluids passing through the reactor. Another key factor in maximizing efficiency is the maintenance of as low a pressure difference between top and bottom of the tower as possible. To ensure this the packing elements should present the minimum resistance to flow. This is promoted by very open structures but open structure alone is of limited use if the elements in the tower nest together such that parts of one packing element penetrate within the space of a second element. It is therefore important that the design of the elements minimize the tendency of the elements to nest together.

The present invention relates particularly to ceramic packing elements that are produced by an extrusion or a dry-pressing process and hence have an essentially uniform cross-section along one axial direction which provides an axis of symmetry for the element. Several such shapes have been described in the art ranging from the very simple to the complex. All are based on an essentially cylindrical shape and differ basically in the internal structure within the cylindrical shape. The simplest structure is a basic cylinder with no internal structure at all. This type of structure is often called a Raschig ring and has been known for many years. At the other end of the complexity scale are the structures described in U.S. Design Pat. No. 455,029 and U.S. Pat. No. 6,007,915. Between the extremes there are simple wagon-wheel shapes such as are described in U.S. Pat. Nos. 3,907,710 and 4,510,263.

It has now discovered that the dimensions of these shapes are critical to achieving optimum performance and the range of dimensions for such optimum performance has not been taught in the prior art. U.S. Pat. No. 4,510,263 teaches L:D ratios of 0.5 to 5 but indicates that preferred ratios are from 0.5 to 2. In U.S. Pat. No. 3,907,710 there is no teaching on the aspect ratio but the Examples use elements with the ratio of 1. U.S. Pat. No. 4,337,178 which teaches cylindrical ceramic elements as catalyst supports, also does not teach specific preferred aspect ratios but utilizes in the Examples elements with aspect ratios of 2.11.

DESCRIPTION OF THE INVENTION

The present invention provides a ceramic packing element having an essentially cylindrical shape with an axis of symmetry in the direction of extrusion defining the length of the element and a greatest dimension perpendicular to the length defining the diameter of the element in which the ratio of the diameter to the length is from 2.7 to 4.5 and preferably from 3.0 to 4.4.

The element is defined as having a containing structure that is essentially cylindrical shape and this is understood to include shapes in which a round cylindrical shape has been somewhat flattened to create an oval cross-section as well as polygonal shapes with at least five sides. The space within the containing structure can have a plurality of septa or none but since a primary application is in the field of heat transfer in which surface area becomes very significant, it is preferred that significant internal structures are provided. In the context of this invention the term "septum" (plural "septa") is used to describe structural member connecting one interior part of the cylindrical containing-structure with another. It therefore includes structures with lengths up to and including diameters.

The ceramic elements of the invention can be formed from any suitable ceramic material such natural or synthetic clays, zeolites, cordierites, aluminas, zirconia, silica or mixtures of these. The formulation can be mixed with bonding agents, extrusion aids, pore formers, lubricants and the like to assist in the extrusion process and/or to generate the desired porosity or surface area for the intended application.

The elements can be used in mass transfer applications or as bases upon which catalytic components are deposited. The elements are particularly suitable for mass transfer applications involving heat recovery from streams of hot gases. An example of such an application is found in thermal regenerators attached to plants whose function is to burn off any combustible material from a waste gas stream. In such regenerators it is vital for efficient operation that the heat values from the exhaust gas stream be used to heat up the incoming waste gas to be treated so as to minimize the cost of fuel required to burn off the combustible material. The present invention teaches a way to optimize the element design to achieve this end.

The elements can however be used with advantage in any application in which the surface area is an important factor in determining the efficiency with which the elements perform their assigned task.

DRAWINGS

DESCRIPTION OF PREFERRED EMBODIMENT

Figure 1:
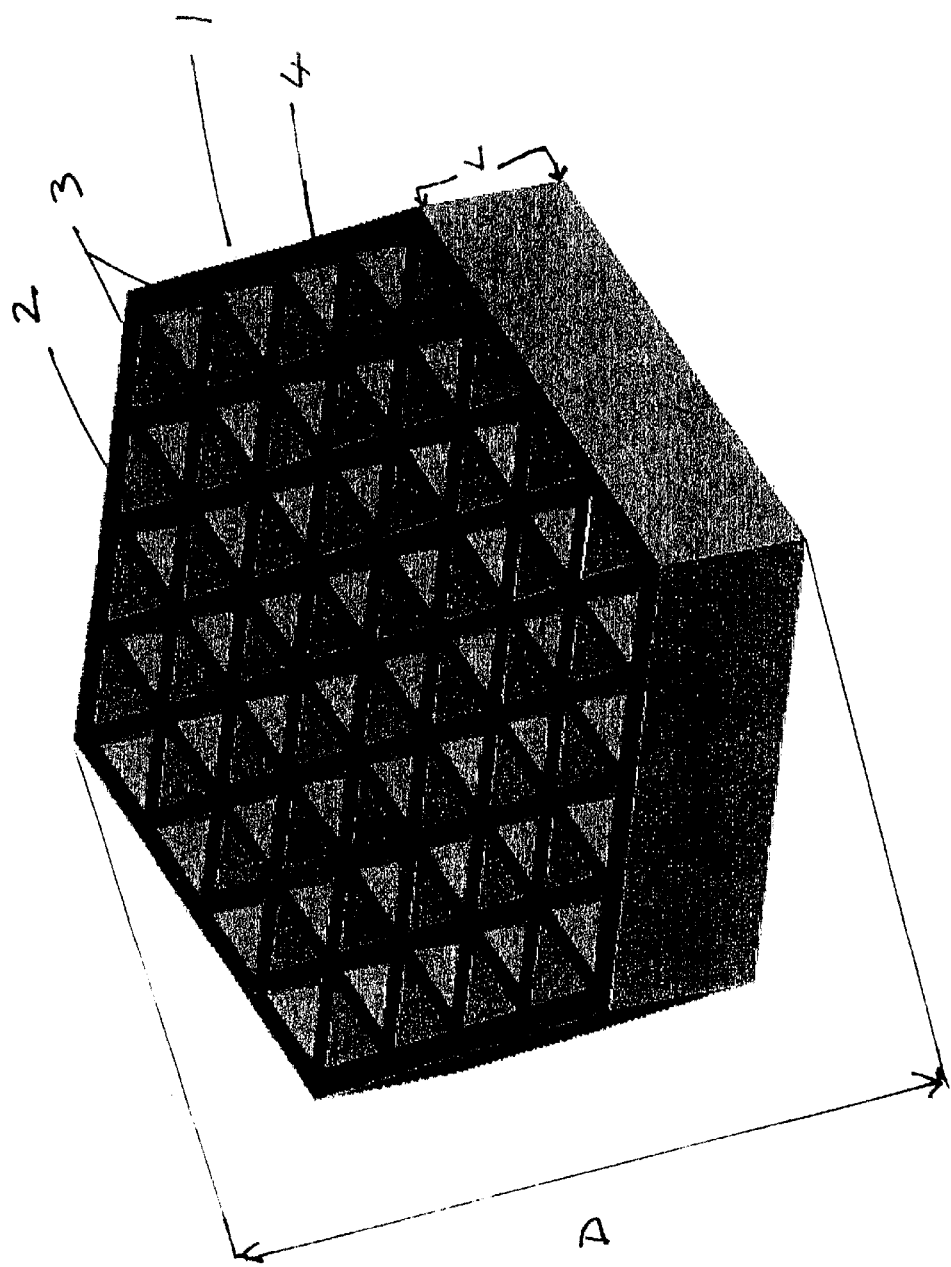
FIG. 1 is a perspective view of a packing element of the invention from a point below and to one side, looking directly at one of the corners.
Figure 2:
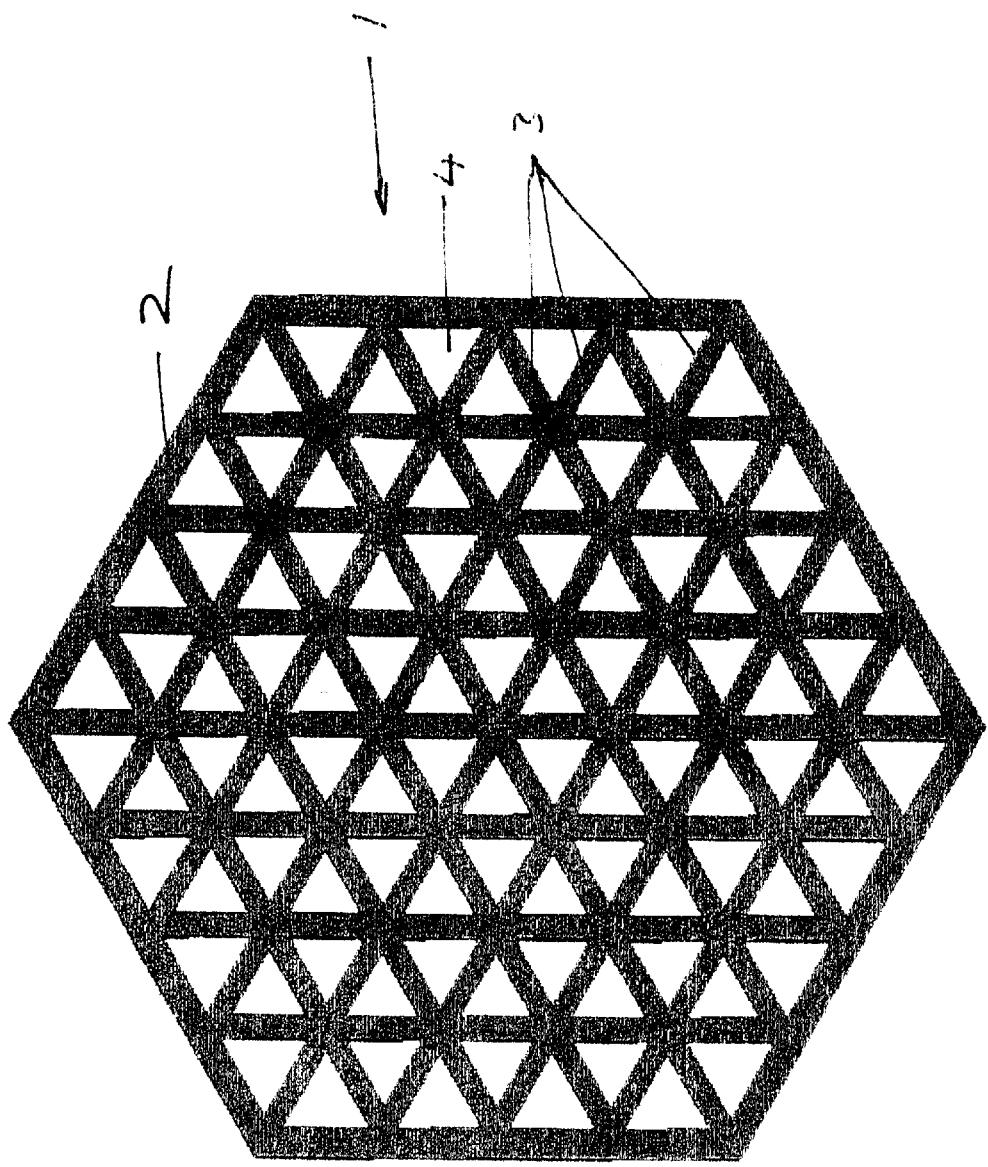
FIG. 2 shows a top view of the same element as is shown in FIG. 1.

The invention is now more particularly described with reference to the embodiment illustrated in the Drawings. This is not intended to imply any necessary limitations in the scope of the invention because it will be readily appreciated that many minor variations could be made without departing from the essential spirit of the invention.

A particularly preferred structure according to the invention comprises a containing structure that is hexagonal with each pair of opposed corners connected by a septum and parallel septa on either side connect the sides meeting at those opposed corners. The overall effect is to provide a plurality of triangular passages through the element, each of essentially the same dimensions. An element of this design is illustrated in the Drawings.

The Drawings show a packing element, 1, with a hexagonal containing structure, 2. A plurality of septa, 3, divide the interior space into a plurality of identical triangular passages, 4, through the element. The element has a length along the axis of symmetry, L, and a greatest dimension perpendicular to the axis of symmetry, D. In the Drawings the ratio of D:L is about 4.

Figure 3:
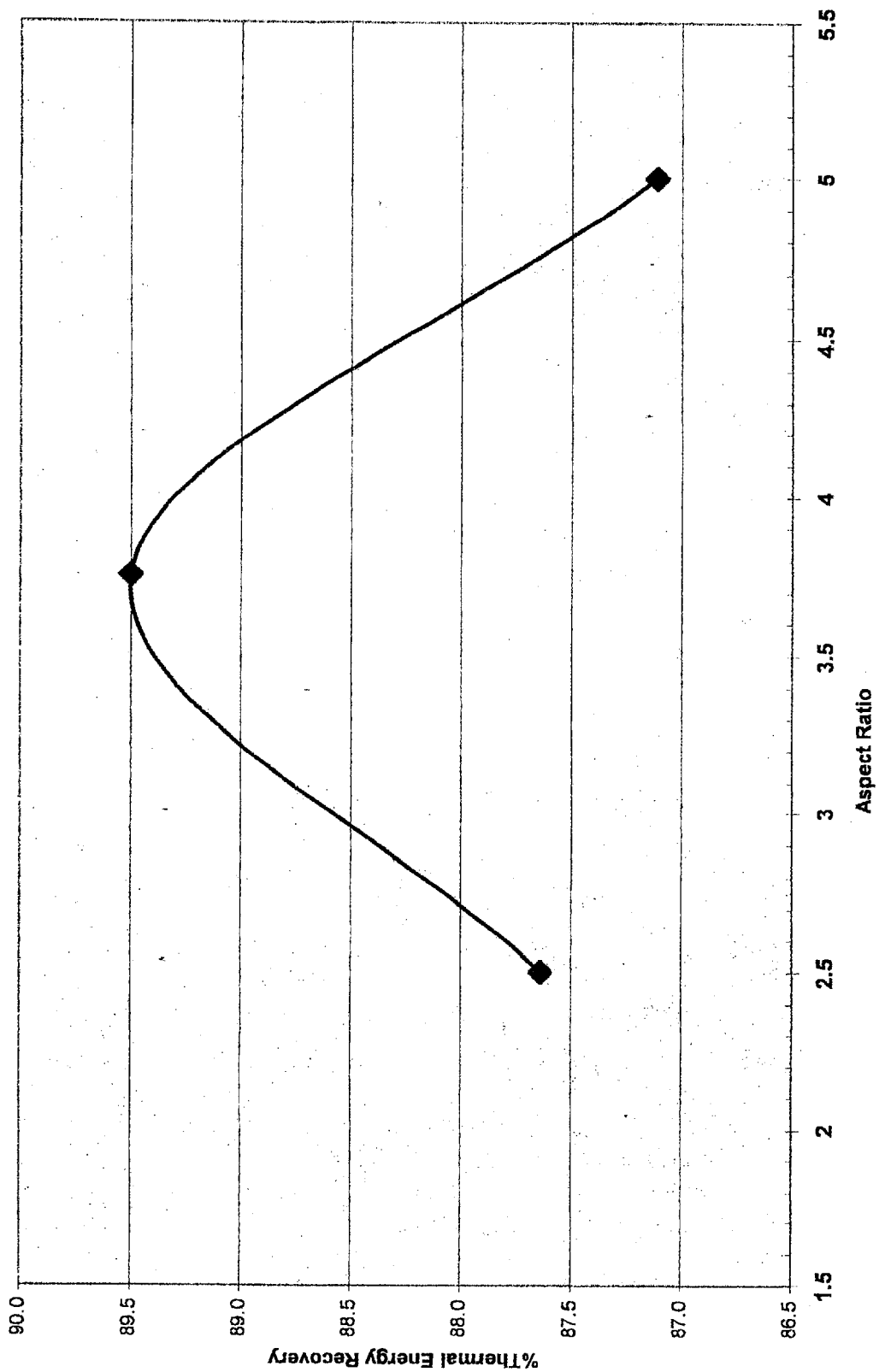
FIG. 3 is a graph of percentage thermal recovery against the aspect ratio of the elements
Figure 4:
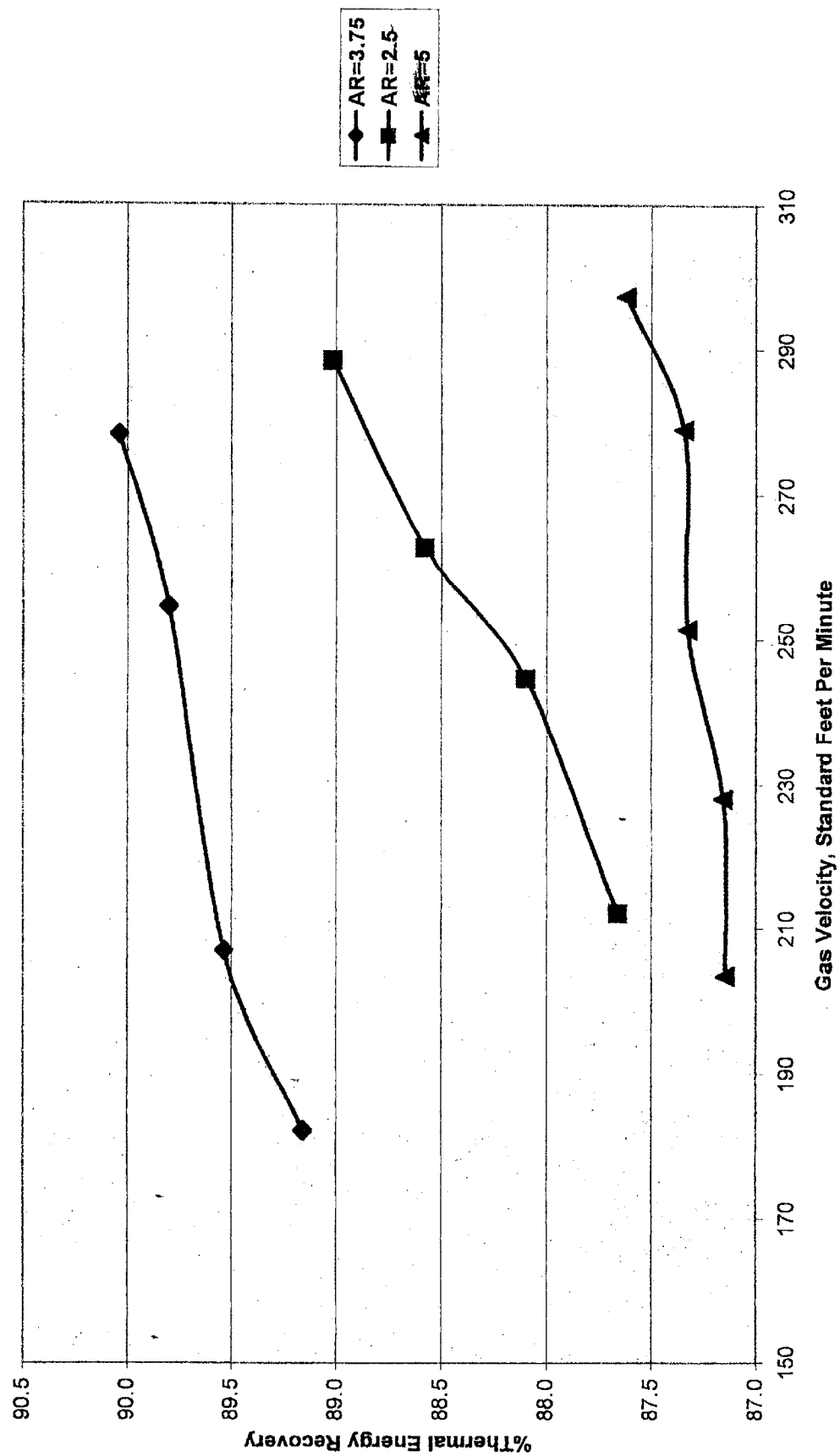
FIG. 4 is a graph of the percentage thermal recovery against gas flow rate.

To demonstrate the significance of the D:L ratio, ceramic elements were prepared with the same D but with three different values of L. These elements were then placed in a tube through which a gas stream at 1500° F., (815.6° C.), was passed at a rate of 207 ft/sec., (74.8 m/sec), and the percentage of the thermal energy in the stream recovered through the contact with the media was measured and plotted against the aspect ratio. The results are shown in FIG. 3. The percentage thermal energy recovery was then determined as a function of the gas velocity for each of the three elements. The results are shown in FIG. 4. From these graphs it is very clear that there is a peak in percentage thermal energy recovery between about 2.7 and 4.5 aspect ratios and particularly between about 3.0 and 4.4 and that this advantage is maintained at all the gas flow rates tested.

This result is completely unexpected since there is no prior art teaching that points in this direction. It is also clearly extremely advantageous that as much thermal energy as possible be recovered by each passage though the elements.

What is claimed is:

1. A ceramic packing element having an essentially cylindrical structure with a polygonal cross-section having at least 5 sides, with an axis of symmetry in a direction defining the length of the element and a greatest dimension perpendicular to the length defining the diameter of the element in which the ratio of the diameter to the length is from 2.7 to 4.5, the cylindrical structure enclosing a plurality of septa to define a plurality of passages through the element, each of the passages having essentially the same length.

2. A ceramic packing element having an essentially cylindrical structure with an axis of symmetry in a direction defining the length of the element and a greatest dimension perpendicular to the length defining the diameter of the element, the ratio of the diameter to the length being from 3.0 to 4.4, the cylindrical structure enclosing a plurality of septa defining a plurality of passages through the element, each of the septa in the packing element being connected at first and second ends thereof with the essentially cylindrical structure and intersects a plurality of other septa at spaced locations along its length.

3. A ceramic packing element according to claim 2 in which the plurality of passages through the element each have essentially the same length.

4. A ceramic packing element according to claim 2 in which the cylindrical structure has a polygonal cross-section having at least 5 sides.

5. A ceramic packing element according to claim 4 having six sides in which the element is provided with a plurality of internal septa defining identical passages through the element each of which has a triangular cross-section.

6. A ceramic packing element according to claim 1 in which the ceramic is made from materials selected from the group consisting of natural or synthetic clays, aluminas, zeolites, cordierite, zirconia, silica and mixtures thereof.

7. A method of recovering thermal energy from a gas stream, the method comprising passing a heated gas stream through a plurality of ceramic packing elements, each of the ceramic elements including an essentially cylindrical structure having a polygonal cross-section having at least 5 sides, with an axis of symmetry in a direction defining the length of the element and a greatest dimension perpendicular to the length defining the diameter of the element in which the ratio of the diameter to the length is from 2.7 to 4.5, the cylindrical structure enclosing a plurality of septa to define a plurality of passages through the element, each of the passages having essentially the same length, the ceramic packing elements recovering heat from the gas stream.

* * * * *

UNITED STATES PATENT AND TRADEMARK OFFICE
CERTIFICATE OF CORRECTION

PATENT NO. : 6,699,562 B2
DATED : March 2, 2004
INVENTOR(S) : Hassan S. Niknafs and Robert L. Miller It is certified that error appears in the above-identified patent and that said Letters Patent is hereby corrected as shown below:

<u>Title page,</u>
Item [73], Assignee: delete "Saint-Gobain Corporation" and insert therefor
-- Saint-Gobain Norpro Corporation --

Signed and Sealed this

Sixth Day of July, 2004

JON W. DUDAS
*Acting Director of the United States Patent and Trademark Office*